United States Patent
Zaccaria et al.

(10) Patent No.: US 10,041,414 B2
(45) Date of Patent: Aug. 7, 2018

(54) METHOD AND SYSTEM FOR STARTING UP AN AIRCRAFT TURBOMACHINE BY REAL-TIME REGULATION OF AIR FLOW

(71) Applicants: Airbus Operations (SAS), Toulouse (FR); Airbus Operations S.L., Getafe (ES)

(72) Inventors: Patrick Zaccaria, Toulouse (FR); Philippe Chareyre, Madrid (ES); Pio Fernandez-Lopez, Madrid (ES); Carlos Casado-Montero, Madrid (ES)

(73) Assignees: AIRBUS OPERATIONS S.L., Getafe (ES); AIRBUS OPERATIONS SAS, Toulouse (FR); GENERAL ELECTRIC COMPANY, Schenectady, NY (US)

( * ) Notice: Subject to any disclaimer, the term of this patent is extended or adjusted under 35 U.S.C. 154(b) by 746 days.

(21) Appl. No.: 14/314,496

(22) Filed: Jun. 25, 2014

(65) Prior Publication Data
US 2014/0373552 A1 Dec. 25, 2014

(30) Foreign Application Priority Data
Jun. 25, 2013 (FR) .................................. 13 56053

(51) Int. Cl.
*F02C 7/277* (2006.01)

(52) U.S. Cl.
CPC .......... *F02C 7/277* (2013.01); *F05D 2220/50* (2013.01); *F05D 2260/85* (2013.01); *F05D 2260/96* (2013.01); *F05D 2270/114* (2013.01); *F05D 2270/304* (2013.01)

(58) Field of Classification Search
CPC .. F02C 7/277; F05D 2220/50; F05D 2260/85; F05D 2260/96; F05D 2270/114; F05D 2270/304; F05D 2270/333; F05D 2270/334
See application file for complete search history.

(56) References Cited

U.S. PATENT DOCUMENTS

| | | | |
|---|---|---|---|
| 4,473,752 A | 9/1984 | Cronin | |
| 4,627,234 A | 12/1986 | Schuh | |
| 5,127,220 A | 7/1992 | Jesrai et al. | |
| 6,575,699 B1 | 6/2003 | Jones | |
| 6,684,898 B2 | 2/2004 | Wiggins et al. | |
| 9,567,906 B2 * | 2/2017 | Nesdill | F02C 7/057 |
| 2009/0314002 A1 * | 12/2009 | Libera | F02C 6/08 60/778 |
| 2010/0085676 A1 | 4/2010 | Wilfert | |

(Continued)

FOREIGN PATENT DOCUMENTS

EP 2305986 A2 6/2011
WO 2013007912 1/2013

OTHER PUBLICATIONS

French Search Report, dated Apr. 29, 2014.

*Primary Examiner* — Arun Goyal
(74) *Attorney, Agent, or Firm* — Greer, Burns & Crain, Ltd.

(57) ABSTRACT

The start-up system comprises a control loop, which regulates in real time the opening of a valve of an air feed of a start-up turbine based on the current measured speed of rotation of a rotor of the turbomachine and a predetermined speed value, said start-up turbine being capable of turning the rotor of the turbomachine for the purpose of the start-up.

8 Claims, 1 Drawing Sheet

(56) References Cited

U.S. PATENT DOCUMENTS

| | | | | |
|---|---|---|---|---|
| 2012/0266606 A1* | 10/2012 | Zeiner | ................... | F02C 7/277 |
| | | | | 60/788 |
| 2013/0019606 A1* | 1/2013 | McLeister | ................ | F02C 9/54 |
| | | | | 60/773 |
| 2014/0123673 A1 | 5/2014 | Mouze et al. | | |
| 2014/0373553 A1 | 6/2014 | Zaccaria | | |
| 2015/0377141 A1* | 12/2015 | Foiret | ................... | F02C 7/057 |
| | | | | 701/113 |

* cited by examiner

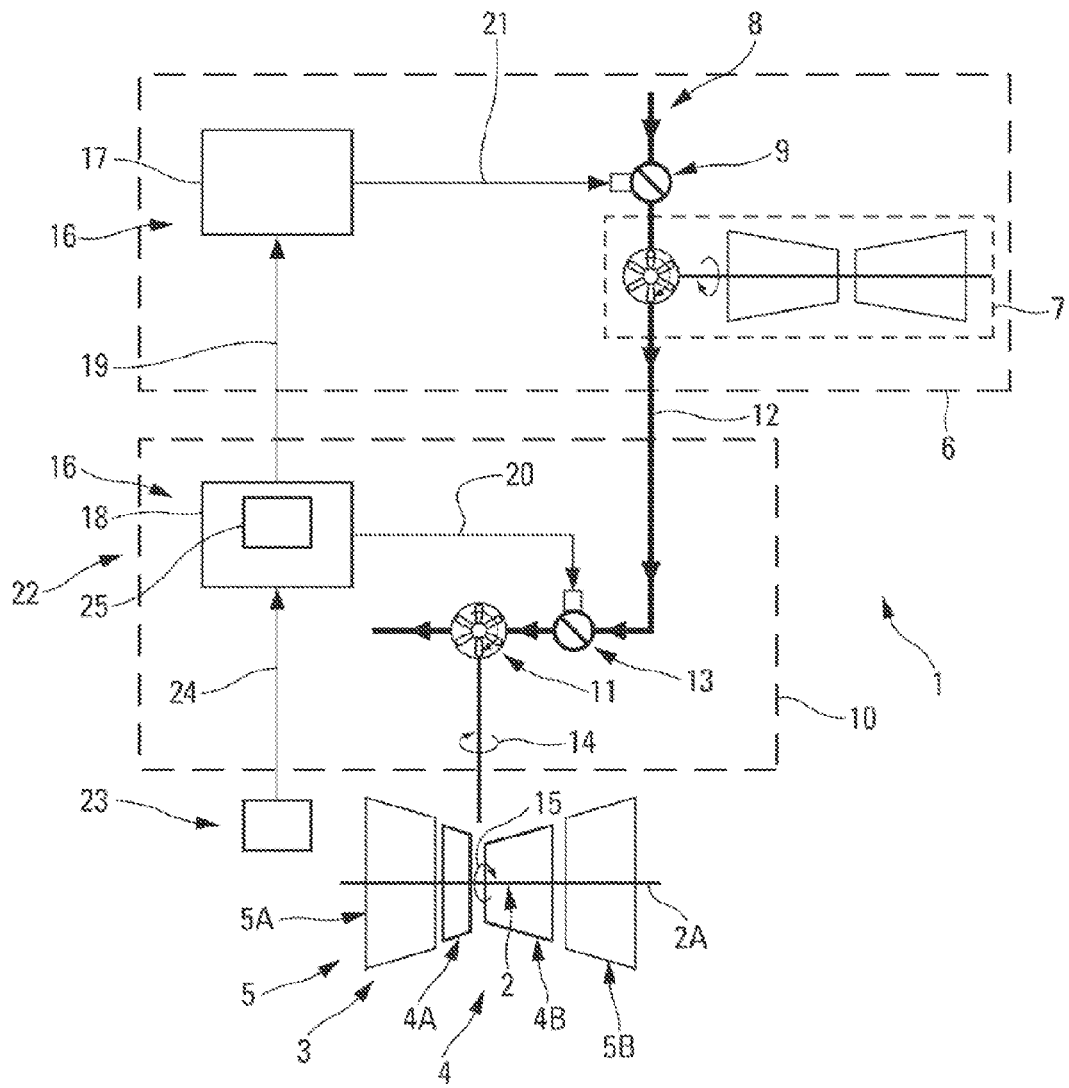

METHOD AND SYSTEM FOR STARTING UP AN AIRCRAFT TURBOMACHINE BY REAL-TIME REGULATION OF AIR FLOW

CROSS-REFERENCES TO RELATED APPLICATIONS

This application claims the benefit of the French patent application No. 201356053 filed on Jun. 25, 2013, the entire disclosures of which are incorporated herein by way of reference.

BACKGROUND OF THE INVENTION

The present invention relates to a method and a system for starting up a turbomachine of an aircraft, in particular of a transport airplane.

The invention applies to a start-up system of the type comprising:
- a ventilation source, in particular an axillary power unit (APU), which is able to produce an airflow and which comprises a compressor fed by an air intake circuit regulated by at least one controllable inlet valve; and
- a start-up turbine, which is fed by said ventilation source via a pneumatic connection and which is able to produce, when subjected to a fluid flow, a mechanical force making it possible to turn a rotor of the engine (turbomachine) of the aircraft for the purpose of the start-up.

The engine is then switched on, in the conventional manner, after injection of fuel in the appropriate elements of the engine, which have been rotated by the rotor.

It is known that, during an operating cycle of an airplane, in particular of a short-haul or medium-haul transport airplane, the airplane lands at an airport generally so as to allow the passengers to disembark and so as to allow other passengers to embark before departing for another destination. This change of passengers generally lasts between thirty minutes and one hour and thirty minutes.

During this time, the engines of the airplane, which are stopped (for reasons of safety), remain hot and do not have time to cool completely. It is estimated that, generally, an engine is cold after having been stopped for approximately one hour and thirty minutes.

Thus, during the waiting time, a thermal gradient at the rotor or the rotors of the engine causes the expansion of some blades and/or of the rotor or rotors, which deform (causing a reduction of the axial or diametrical play with respect to the normal axis of rotation of the blading, an expansion of the blades, etc.).

During the restart, if the engine has not had time to cool sufficiently, the ends of some blades of the rotor are at risk of rubbing against the casing, or a blading will be slightly offset from its axis of rotation. This phenomenon, referred to as "bowed rotor", lasts until the temperature between the bladings becomes uniform due to the operation (rotation and reduction of internal thermal gradients, realignment of the turning parts) of the engine.

The rotation of incorrectly aligned turning parts of the engine leads to vibrations due to the imbalance. These vibrations become particularly detrimental for some values of speed of rotation of the turning parts, that is to say the speed N2 of the compression rotor (high-pressure model) of a turbofan. This is particularly the case for values of speed N2 approaching critical frequencies of the engine, due to the specific amplification of rotor/stator friction in the vicinity of the vibratory resonances.

The aforementioned phenomenon causes a significant increase of the fuel consumption due to a loss of aerodynamic efficacy in particular of different elements of the engine, moreover irreversibly (wear of the ends of the blades).

SUMMARY OF THE INVENTION

An object of the present invention is to prevent (or at least limit) such vibrations, which are very disadvantageous, caused by imbalance.

The invention relates to a method for starting up an aircraft turbomachine with the aid of a start-up system comprising at least:
- one ventilation source able to produce an airflow and provided with a compressor fed by an air intake circuit regulated by at least one inlet valve, said inlet valve being able to be controlled; and
- at least one start-up turbine fed by said ventilation source via a pneumatic connection, said start-up turbine being able to produce, when subjected to a flow of air, a mechanical force making it possible to turn a rotor of the turbomachine for the purpose of the start-up.

In accordance with the invention, said method comprises the following two successive steps, implemented automatically and repeatedly, so as to regulate the opening of said inlet valve in real time:
- a first step of determining a valve control order, comprising:
  - a first sub-step of measuring the speed of rotation of the rotor of the turbomachine;
  - a second sub-step of comparing the measured speed of rotation with a predetermined speed value (reference speed); and
  - a third sub-step of calculating a valve control order on the basis of the result of this comparison; and
- a second step of controlling the opening of said inlet valve in accordance with said valve control order.

Thanks to the invention, during the entire length of the start-up implemented with the aid of said start-up system, the opening of said inlet valve is thus regulated in real time based on the current measured speed of rotation of the rotor, which makes it possible to adjust said speed of rotation so as to prevent the aforementioned phenomena, and in particular so as to avoid the aforementioned critical frequencies.

In fact, this regulation of the air inlet valve regulates the air feed of the ventilation source and consequently the flow of air provided by said ventilation source to the start-up turbine, which generates the rotation of the rotor and controls the speed of rotation thereof.

Thus, the present invention makes it possible to overcome the drawback indicated above and to prevent (or at least limit) the very disadvantageous vibrations caused by imbalance by avoiding encountering critical frequencies of the engine (turbomachine), at least whilst there is a significant phenomenon of the "bowed rotor" type.

The control loop thus makes it possible for the speed of rotation of the rotor to follow said predetermined speed value. This predetermined speed value may be a constant value or, preferably, a value that varies as a function of time. In a particular embodiment, said predetermined speed value is a value dependent on time and having two successive plateaus at two predetermined speeds of rotation, the speed of rotation of the first plateau being slower than that of the second plateau.

In addition, in a preferred embodiment, said turbomachine is a turbofan, and said speed of rotation is the speed N2 of rotation of the compression rotor of the high-pressure module of this turbofan.

The present invention also relates to a system for starting up an aircraft turbomachine In accordance with the invention, said start-up system of the type comprising:
- a ventilation source able to produce a flow of air and provided with a compressor fed by an air intake circuit regulated by at least one inlet valve, said inlet valve being able to be controlled;
- at least one start-up turbine fed by said ventilation source via a pneumatic connection, said start-up turbine being able to produce, when subjected to a flow of air, a mechanical force making it possible to turn a rotor of the turbomachine for the purpose of the start-up; and
- a control system capable of controlling at least said inlet valve, is notable in that said control system comprises a control loop for controlling the opening of said inlet valve, comprising at least one sensor configured to measure the current speed of rotation of the rotor, and in that said control system is configured to determine a valve control order based on the measured speed of rotation of the rotor and a predetermined speed value, and to control the opening of said inlet valve in accordance with said valve control order.

Thus, thanks to the invention, the start-up system comprises a control loop that, during the entire length of the start-up implemented with the aid of said start-up system, regulates the opening of said inlet valve in real time based on the current measured speed of rotation of the rotor, which makes it possible to control said speed of rotation suitably and as desired, in particular so as to prevent the aforementioned phenomena, and in particular so as to avoid encountering the critical frequencies of the turbomachine whilst there is a significant imbalance.

In a preferred embodiment, said control system comprises a first and a second control unit connected together, said first control unit being configured to receive data, carry out processing operations and transmit a piece of control information to said second control unit, and said second control unit being configured to control the opening of said inlet valve based on the piece of control information received from said first control unit.

BRIEF DESCRIPTION OF THE DRAWINGS

The sole FIGURE of the accompanying drawing will explain how the invention can be implemented.

This sole FIGURE is the circuit diagram of a system for starting up a turbomachine, illustrating one embodiment of the invention.

DETAILED DESCRIPTION OF THE PREFERRED EMBODIMENTS

In accordance with one embodiment of the present invention, FIG. 1 illustrates a dispenser, generally indicated at 2 and having a tip structure 4, for mixing at least two separate streams of components into a combined fluid stream, such as a sealant, or tissue sealant or other combined fluid stream. Although the dispensers, systems and methods are generally illustrated and described in the context of a tissue sealant dispenser, it is understood that the present invention is not limited to such a dispenser or to the mixing of tissue sealant components, and that the present invention has applications in a variety of settings where mixing of component fluid streams is desired.

The start-up system 1 illustrating the invention and shown schematically in the FIGURE is intended to rotate a rotor 2 of a turbomachine 3 of an aircraft for the purpose of starting up the turbomachine 3.

In a preferred embodiment, said turbomachine 3 is an aircraft turbofan. Such a turbojet conventionally and generally comprises:
- a high-pressure coupling 4 provided with a high-pressure compressor 4A and
- a high-pressure turbine 4B connected together by means of the shaft 2A of said rotor 2; and
- a low-pressure coupling 5 provided with a low-pressure compressor 5A and a low-pressure turbine 5B.

Said start-up system 1 is of the type comprising:
- a ventilation source 6, that is to say an auxiliary power unit (APU) in the example of FIG. 1. This ventilation source 6 is able to produce a flow of air and comprises a conventional compressor 7 (not described further), which is fed by an air intake circuit 8 regulated by at least one controllable inlet valve 9, for example of the IGV (inlet guide vane) type. The ventilation source 6 is put into operation in the conventional manner by the pilot before he triggers the procedure of starting the engine (turbomachine 3); and
- a start-up device 10 comprising a start-up turbine 11, which is fed by said ventilation source 6 via a pneumatic connection (pipe) 12. This pneumatic connection 12 comprises at least one controllable start-up valve 13, for example a start-up valve of the SAV (starter air valve) type, which is arranged upstream of the start-up turbine 11 (in the direction of air flow, indicated by arrows on the connection 12 of FIG. 1). The start-up turbine 11 is able to produce, when subjected to a flow of air (originating from the ventilation source 6), a mechanical force (illustrated by an arrow 14 in FIG. 1) making it possible to turn the rotor 2 of the turbomachine 3, as illustrated by an arrow 15, so as to start said turbomachine.

This rotation of the rotor 2 (the high-pressure rotor of the engine) makes is possible, in the conventional manner, to compress the air that reaches the combustion chamber of the engine. The engine is then switched on by injection of fuel into the combustion chamber and by ignition of the air/fuel mixture.

Said start-up system 1 further comprises a control system 16 capable of controlling in particular said inlet valve 9. In the embodiment of FIG. 1, this control system 16 comprises two control units 17 and 18 connected together by means of a connection 19. The control unit 18, in particular a control unit of the ECU (engine control unit) type, is intended in particular to control said start-up valve 13 via a connection 20. A control unit 18 of the ECU type is conventionally and generally a computer dedicated to the operation of the engine, said computer commanding actuators in the engine, in order to control the engine, via signals transmitted by sensors of the engine and of the aircraft, and via commands from the pilot. This control unit 18 is in particular configured to receive data, to perform processing operations and to transmit control information to the control unit 17. Said control unit 17, in particular an electronic regulator of the ECB (electronic control board) type, is configured, for its part, to control the opening of the inlet valve 9 based on the control information received from said control unit 18. This control information takes the form of an indicator.

In accordance with the invention, said start-up system 1 comprises a loop control 22 intended to regulate the opening of said inlet valve 9 in real time. This control loop 22 comprises:
- at least one conventional sensor 23, which is configured to measure the current speed of rotation of the rotor 2 in real time; and
- a processing element 25, which is preferably integrated in the control unit 18, which is connected by means of a connection 24 to said sensor 23 and which is formed so as to determine a valve control order in real time based on the measured speed of rotation of the rotor 2 and a desired predetermined speed value. This valve control order is transmitted from the control unit 18 to the control unit 17, which controls the opening of said inlet valve 9 in accordance with said order.

The control loop 22 is adapted to meet the usual criteria of stability, response time and precision specific to any regulated system.

This regulation in real time of the inlet valve 9, implemented with the aid of the control loop 22, regulates the air feed of the ventilation source 6 and, consequently, the flow of air provided by said ventilation source to the start-up turbine 11, which generates the rotation of the rotor 2 and controls the speed of rotation thereof. The objective of the valve control order (transmitted to the control unit 17) is therefore to adjust the opening of the inlet valve 9 so as to adjust the current speed of rotation such that this corresponds to said predetermined speed value.

The inlet valve 9 intended to regulate the air intake circuit 8 can be formed in different ways and makes it possible to regulate the amount of air that circulates in the pipe 12. The angle of aperture of the inlet valve is adjusted with precision by an actuator, said angle of aperture being adjustable within the entire available range. This angle of aperture is controlled by the control unit 17.

In addition, by a progressive modification of the angle of aperture of the inlet valve 9 (in the direction of a greater opening or in the direction of a smaller opening), a variation of the air feed flow is obtained, making it possible to obtain a progressive modification of the speed of rotation N2 of the rotor 2.

Said start-up system 1 makes it possible to implement a specific method of rotating the rotor 2 and of starting up the turbomachine 3. In accordance with the invention, this method comprises the two following successive steps, which are implemented automatically and repeatedly for the entire duration of the start-up phase so as to regulate the opening of said inlet valve 9 in real time:
- a first step of determining a valve control order, comprising sub-steps:
  - of measuring the speed of rotation of the rotor 2 of the turbomachine 3;
  - of comparing the measured speed of rotation of the rotor 2 with a predetermined speed value; and
  - of calculating a valve control order on the basis of the result of this comparison; and
- a second step of controlling the opening of said inlet valve 9 in accordance with said valve control order.

Thanks to the invention, during the entire length of the start-up phase implemented with the aid of said start-up system 1, the control loop 22 regulates the opening of said inlet valve 9 in real time based on the current measured speed of rotation of the rotor 2, which makes it possible to control said speed of rotation suitably, in particular so as to avoid the aforementioned critical frequencies.

The control loop 22 makes it possible for the speed of rotation to follow said predetermined speed value. This predetermined speed value may be a constant value or, preferably, a value that varies as a function of time. In a particular embodiment, said predetermined speed value is a value dependent on time and having two successive plateaus at two predetermined speeds of rotation, the speed of rotation of the first plateau being slower than the speed of rotation of the second plateau (which preferably corresponds to a maximum speed).

To control the speed N2 during the ventilation, which is generated by the system 1, the control unit 18 thus compares (with the of the processing element 25) the measured speed N2 with the desired speed N2c, and sends a signal (or piece of control information) to the control unit 17 indicating whether the quantity of air provided by the ventilation source 6 has to be reduced (so as to decrease N2) or increased (to increase N2). The control unit 17 adjusts the position of the inlet valve 9 depending on the value of this signal received from the control unit 18.

By way of simplified illustration of the control loop 22, the signal sent by the control unit 17 could assume discrete values V1, V2 or V3, these being such that:
- the value V1 indicates that the quantity of air provided by the ventilation source 6 is correct. In this case, the control unit 18 confirms that the reference speed N2c is observed, and the control unit 17 maintains the current position of the inlet valve;
- the value V2 indicates that the quantity of air provided is insufficient. In this case, the control unit 18 confirms that the reference speed N2c has not yet been reached, and the control unit 17 increases the opening of the inlet valve 9; and
- the value V3 indicates that the quantity of air provided is excessive. In this case, the control unit 19 confirms that the reference speed N2c has been surpassed, and the control unit 17 decreases the opening of the inlet valve 9.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for starting up an aircraft turbomachine with aid of a start-up system comprising at least:
   - one ventilation source able to produce and to provide a flow of air with a compressor fed by an air intake circuit regulated by at least one inlet valve located upstream of the compressor, said inlet valve being able to be controlled; and
   - at least one start-up turbine fed by said ventilation source via a pneumatic connection, connecting the compressor to said start-up turbine, a controllable start-up valve being arranged on the pneumatic connection upstream of the start-up turbine, said start-up turbine being able to produce, when subjected to the flow of air, a mechanical force making it possible to turn a rotor of the turbomachine for a purpose of the starting up, wherein said method comprises following two successive steps, implemented automatically and repeatedly, so as to regulate an opening of said inlet valve in real time:
   - a first step of determining a valve control order for controlling the inlet valve, comprising:

a first sub-step of measuring a speed of rotation of the rotor of the turbomachine;

a second sub-step of comparing the measured speed of rotation of the rotor measured in the first sub-step with a predetermined speed value; and a third sub-step of calculating a valve control order on the basis of result of the comparison; and a second step of controlling the opening of said inlet valve in accordance with said valve control order.

2. The method as claimed in claim 1, wherein said predetermined speed value varies as a function of time.

3. The method as claimed in claim 1, wherein said turbomachine is a turbofan, and in that said speed of rotation is the speed of rotation of a high-pressure rotor of said turbofan.

4. The method as claimed in claim 1, wherein control of the inlet valve provides a variation of the flow of air therethrough to obtain a progressive modification of the current speed of rotation of the rotor.

5. The method as claimed in claim 1, wherein said predetermined speed value is a constant.

6. A system for starting up an aircraft turbomachine, said system comprising:

a ventilation source able to produce and to provide a flow of air with a compressor fed by an air intake circuit regulated by at least one inlet valve located upstream of the compressor, said inlet valve being able to be controlled;

at least one start-up turbine fed by said ventilation source via a pneumatic connection, connecting the compressor to said start-up turbine, a controllable start-up valve being arranged on the pneumatic connection upstream of the start-up turbine, said start-up turbine being able to produce, when subjected to the flow of air, a mechanical force making it possible to turn a rotor of the turbomachine for a purpose of the starting up; and a control system capable of controlling at least said inlet valve, wherein said control system comprises a control loop for controlling an opening of said inlet valve, comprising at least one sensor configured to measure a current speed of rotation of the rotor, and wherein said control system is configured to determine a valve control order for controlling the inlet valve based on the measured current speed of rotation of the rotor measured by the at least one sensor and a predetermined speed value and to control the opening of said inlet valve in accordance with said valve control order.

7. The system as claimed in claim 6, wherein said control system comprises a first control unit and a second control unit connected together, wherein said first control unit is configured to receive data, carry out processing operations and transmit a piece of control information to said second control unit, and wherein said second control unit is configured to control the opening of said inlet valve based on the piece of control information received from said first control unit.

8. The system as claimed in claim 6, wherein control of the inlet valve provides a variation of the flow of air therethrough to obtain a progressive modification of the current speed of rotation of the rotor.

* * * * *